United States Patent
Varekamp

(10) Patent No.: US 7,359,768 B2
(45) Date of Patent: Apr. 15, 2008

(54) ROUTE INPUT SYSTEM

(75) Inventor: Patrick R. Varekamp, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 767 days.

(21) Appl. No.: 10/978,907

(22) Filed: Oct. 29, 2004

(65) Prior Publication Data

US 2006/0106660 A1    May 18, 2006

(51) Int. Cl.
*G05D 7/00* (2006.01)
(52) U.S. Cl. .................................... 700/282
(58) Field of Classification Search ........... 700/282, 700/95, 97, 112, 101, 102
See application file for complete search history.

(56) References Cited

U.S. PATENT DOCUMENTS

| | | | |
|---|---|---|---|
| 5,050,088 A * | 9/1991 | Buckler et al. ............ | 700/96 |
| 6,128,588 A | 10/2000 | Chacon | |
| 6,263,255 B1 | 7/2001 | Tan et al. | |
| 6,470,227 B1 | 10/2002 | Rangachari et al. | |
| 6,810,294 B2 | 10/2004 | Rangachari et al. | |
| 6,889,178 B1 | 5/2005 | Chacon | |
| 6,928,625 B2 * | 8/2005 | Makinen ................... | 715/822 |
| 2002/0156548 A1 | 10/2002 | Arackaparambil et al. | |
| 2003/0149608 A1 * | 8/2003 | Kall et al. ................ | 705/8 |
| 2003/0202312 A1 * | 10/2003 | Anthony et al. .......... | 361/111 |
| 2003/0211640 A1 * | 11/2003 | Orimoto .................... | 438/14 |

FOREIGN PATENT DOCUMENTS

| | | |
|---|---|---|
| EP | 1072967 | 7/2000 |
| WO | WO01/38976 | 5/2001 |
| WO | WO01/69329 | 9/2001 |
| WO | WO03/009071 | 1/2003 |

* cited by examiner

*Primary Examiner*—Thomas K Pham
(74) *Attorney, Agent, or Firm*—Yuanmin Cai; Howard Cohn

(57) ABSTRACT

A software-enabled Route Input System (RIS) process facilitates consistent communication among the various entities involved in route creation, where the entities have different tasks and objectives. The primary teams are the process flow definers (IE), individual process owners (PE) and the execution team that assembles the process steps into a final manufacturing flow (RBT). The IE and PE provide process flow sequence and/or process operation details required by the RBT. Additional business rules are applied by the execution team to process the input data into its final form. The RIS assures a high level of quality and consistency in the route build process, which permits more efficient and lower cost operation of the manufacturing line. The RIS may be used with any Manufacturing Execution System (MES).

20 Claims, 9 Drawing Sheets

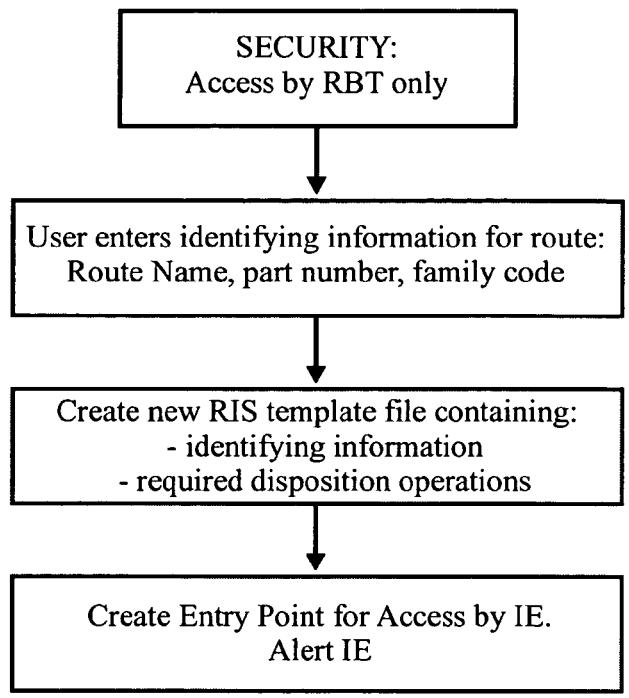

FIG. 4C

| Step # | Operation ID | Remarks/Notes | Actions | | | |
|---|---|---|---|---|---|---|
| 1 | INS PECVD | | ADD Step | EDIT | MOVE | DELETE |
| 2 | CMP | Special Tool | • | • | • | • |
| 3 | MTL | • | • | • | • | • |
| | | • | • | • | • | • |
| 49 | CMP abc | • | • | • | • | • |
| | | • | • | • | • | • |
| n | DISP_EOL | | | | | |

[DONE EDITING]  [UPDATE SECURITY]

[SUBMIT ROUTE FOR BUILD]

FIG. 4D

[ADD - MANUAL]      OPERATION ID   [CMP ▼   abc]   ⬐PE Work Area

[ADD - FROM MENU]   OPERATION ID   [                    ▼]

[ADD - FROM EXISTING ROUTE]   ROUTE ID   [                ▼]

FIG. 4E

STEP/OPERATION    STEP #   OPERATION ID
                  [       |              ▼]

[CONFIRM]

[CANCEL]

FIG. 5B
ROUTE NAME
FIG. 5C
| Step # | Operation ID | Remarks/Notes | Actions | | |
|---|---|---|---|---|---|
| 49 | CMP abc | Special Tool | APPROVE | REJECT | |
| 271 | CMP 035 | • | • | • | |
| 318 | CMP 002 | • | • | • | |
| | | • | • | • | |
| | | • | • | • | |
| | | • | • | • | |
| | | | | | |
| | | | | | |

FIG. 6B
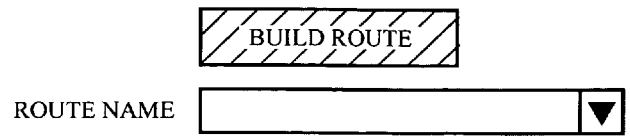
ROUTE NAME
FIG. 6C
| Step # | Operation ID | Remarks/Notes | Additional MES Information |
|---|---|---|---|
|  |  |  |  |
|  |  |  |  |
|  |  |  |  |
FIG. 6D
| Step # | RIS Operation ID | MES Operation ID | Comments |
|---|---|---|---|
|  |  |  |  |
|  |  |  |  |
|  |  |  |  |
FIG. 6E
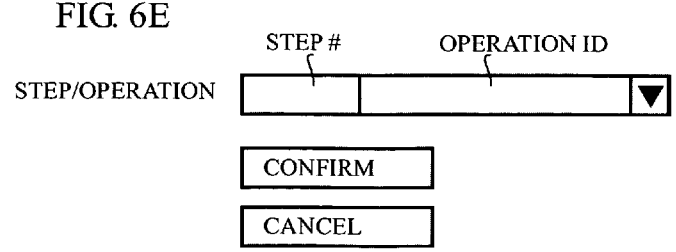

ROUTE INPUT SYSTEM

BACKGROUND OF THE INVENTION

This invention relates to techniques for creating "routes" for a manufacturing process flow, and more particularly to creating routes for fabrication processes for semiconductor devices. As used herein, a "route" is a sequential series of manufacturing process steps.

Multiple teams of people are needed to define and create a manufacturing process flow for semiconductor device fabrication. Individuals and groups belonging to these teams are referred to herein as "entities." These entities include:

(1) Integration Engineer (IE): An entity, also referred to as "requestor", who knows the final product configuration (that is, what the finished product should look like), and defines the process flow. The IE makes input to the route build process.

(2) Route Builder (RBT): An entity who decides how to execute the processes available to build the product. The RBT assembles individual process steps into the final manufacturing process flow. This entity is not found in all manufacturing environments. In general, however, a fully automated semiconductor fab is so complicated that they have an important task.

(3) Process Engineer (PE): An entity who is responsible for the process tools in which the devices are actually built; that is, individual processes in the overall process flow. The PE is concerned about tool performance (tool setup, checks and feedback), and must monitor and deliver acceptable product yield.

(4) Manufacturing: An entity which carries out processes prescribed by the Route Builders (RBT) by directing automated tools set up by the Process Engineers (PE).

All of the above-named entities are found in a typical semiconductor device manufacturing facility. The present invention is related to how these entities interact with one another to arrive at a valid route for a manufacturing process. The invention will be described in detail below with reference to a process for manufacturing semiconductor chips in a "fab" or fabrication facility.

Each of the entities mentioned above often have different, sometimes conflicting, objectives. For example:

(1) The objective of the Integration Engineer (IE) is to make the highest performance (speed) and yield (quality) chip in the shortest time possible. The IE is prone to try novel combinations of existing and new processes to achieve these objectives.

(2) The objective of the Route Builder (RBT) is to make routes as quickly as possible but the routes must themselves have the highest quality and consistency possible to assure smooth flow of product on the route at time of manufacture. Since there are many IE entities requesting routes for different purposes, it is the responsibility of the RBT to decide where route sub-units can be shared and thus have assured consistency across the customer set.

(3) The objective of the Process Engineer (PE) is to create processes in the fab that have high quality and reliability and that do not harm the fab, such as by damaging the tools or causing slowdowns. Poor ordering (sequencing) of process steps can result in damage to the tools. The PE sometimes has to impose limitations upon the IE with regard to experimenting with new or modified processes.

(4) The objective of Manufacturing is to process the product on the route as quickly as possible. Manufacturing typically does not consider the yield impacts in their efforts to expedite the processing of the product.

It is important to implement a system for communication among these multiple entities to define an acceptable manufacturing process flow. However, the input phase of the route creation activity is typically uncontrolled and based largely on ad hoc communications (e.g. email) among the various entities. In many instances, multiple emails with spreadsheets are exchanged between the entities. For example, when the Manufacturing Execution System (MES) SiView is used, a typical email communication is a modified equipment relation flow report from SM (specification manager, part of SiView) copied into a spreadsheet. The result of this practice is that too much information is given on some aspects of the route, and not enough on others. Generally, no consistency in the information required to build the route is enforced by the route builder (RBT) or requestor (IE). Such ad hoc communication solutions are not efficient and not appropriate in a high cost and possibly fully automated manufacturing environment. Accordingly, there is a need for a system for facilitating agreement among the various entities regarding the ordering and content of process steps.

SUMMARY OF THE INVENTION

The present invention addresses the above-described need by providing a system which imposes a level of rigor and formality on the communications process, leading to more reliable results, more quickly than is presently available. This is done by providing a software-enabled process which facilitates consistent communication among the various entities involved in route creation, where the entities have different tasks and objectives.

One objective of the present invention is to control the process of inputting data into a Manufacturing Execution System (MES). An example of an MES is called SiView built by iiSC in Japan. In this particular MES version, process operations can be uniquely described by so called "Logical Recipes". (The particular details of the MES or the names of the process operations in that MES are not critical to the description of the present invention.)

A Route Input System (RIS) according to one aspect of the present invention creates an efficient communication network among the several entities involved in route creation in order to define a flow of recipes (a manufacturing flow) acceptable to all. The primary teams are the process flow definers (Integration Engineers, "IE"), the individual process owners (Process Engineers, "PE") and the execution team that will assemble the process steps into the final manufacturing flow (Route Builder or Route Build Team, "RBT"). Each of the "input" entities (mostly E, sometimes PE) provides the appropriate information (process flow sequence or process operation details) that is required by the "execution" entity (RBT). Additional business rules are applied by the execution team to process the input data into its final form. In general, the RBT executes the orders principally of the IE, and possibly of the PE, in either case typically without questioning or challenging those orders.

According to another aspect of the invention, a method of building a route which is a sequential series of manufacturing process steps for manufacturing a product comprises: defining an Integration Engineer (IE) entity responsible for what the product should look like and making input to the route build process; defining a Route Builder (RBT) entity responsible for executing building of the route that will generate the product; defining a Process Engineer (PE) entity responsible for the processes and the tools which actually build the product; defining a manufacturing entity responsible for implementing the manufacturing process by building the product; and performing the steps of first allowing access only by the RBT entity for entering identifying information for the route; then allowing access only by the IE entity so that the IE can add, edit, move or delete operations in the route; then allowing access only by the PE entity so that the PE can examine certain steps in the route; and then allowing access again only by the RBT entity so that the RBT can create a flow for the manufacturing entity to follow.

According to an additional aspect of the invention, a computerized method of building a new route which is a sequential series of manufacturing process steps for manufacturing a product comprises: defining an Integration Engineer (IE) entity responsible for what the product should look like and making input to the route build process; defining a Route Builder (RBT) entity responsible for executing building of the route that will generate the product; and defining a Process Engineer (PE) entity responsible for the processes and the tools which actually build the product; defining a manufacturing entity responsible for implementing the manufacturing process by building the product; allowing the IE entity to make a new route request by communicating with the RBT entity, identifying starting inputs, and together deciding if the new route has any overlap with existing routes so that an existing route can be used as a starting point for the new route; allowing the IE entity to define a flow; allowing the PE entity to create any new processes requested by the IE entity or reject the request to create said processes; allowing the RBT entity to build the route following the IE entity's specification; and allowing the IE entity to approve the flow.

According to a further aspect of the invention, a computer-readable storage medium is provided having computer readable program code embodied therein, for causing building of a route which is a sequential series of manufacturing process steps for manufacturing a product; the computer readable program code causes a computer to effect the above-described method.

The Route Input System (RIS) of the present invention provides a way to control the process of building a route to manufacture product, and manages the communication between the multiple teams involved in the process. In particular, the RIS of the present invention permits the communication between the route requester (IE) and the route builder (RBT) to be controlled in an efficient and consistent manner. The RIS thus assures a high level of quality and consistency in the route build process, which translates to a more efficient and lower cost operation of the manufacturing line.

The RIS of the present invention may be used with any MES, even a completely manual one. When implemented on a computer system, the advantage of the RIS is enhanced by having access to two of the MES databases: one containing the existing operations and one containing the existing routes.

BRIEF DESCRIPTION OF THE DRAWINGS

The structure, operation, and advantages of the present invention will become further apparent upon consideration of the following description taken in conjunction with the accompanying figures. The figures are intended to be illustrative and not limiting.

FIGS. 3A, 3B, 4A, 4B, 4C, 4D, 4E, 5A, 5B, 5C, 6A, 6B, 6C, 6D, 6E and 7 are diagrams relating to the flowchart of FIG. 2, according to the invention. This includes flow charts (FIGS. 3A, 4A, 5A, 6A, 7) illustrating the methodology of the present invention, as well as menus and other information that would appear on a display device viewed by a user; that is, quasi screen shots.

DETAILED DESCRIPTION OF PREFERRED EMBODIMENTS OF THE INVENTION

In the description that follows, numerous details are set forth in order to provide a thorough understanding of the present invention. It will be appreciated by those skilled in the art that variations of these specific details are possible while still achieving the objectives of the present invention.

Figure 1:
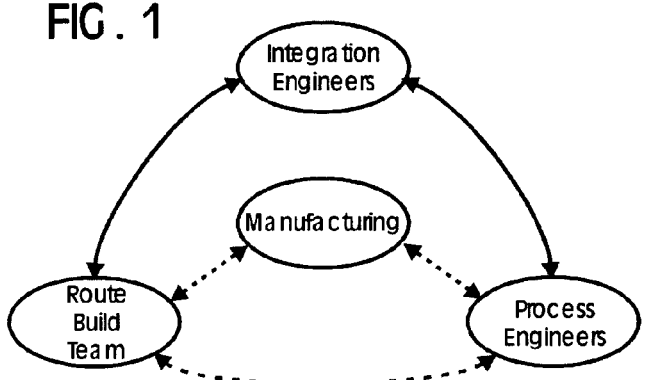
FIG. 1 is a diagram showing the various teams involved in a route build process.

FIG. 1 is a diagram showing the three teams (entities) involved in the design process (creating the process flow), plus the manufacturing entity which is responsible for implementing the design process, and the general lines of communication among various entities. The various entities include:

1. Integration Engineers (IE): People who know what the final product should look like. IE makes input to the route build process.
2. Route Build Team (RBT): People who decide how to execute the building of the route that will generate the final desired product. This team is not found in all manufacturing environments. However, a fully automated semiconductor fab is so complicated that this team is often critically necessary.
3. Process Engineers (PE): People responsible for the processes and the tools that actually build the product devices. Process Engineers are concerned about tool performance (tool setup, checks and feedback), and must monitor and deliver product yield.
4. Manufacturing: The Manufacturing team carries out processes prescribed by the Route Builders (RBT) by directing automated tools set up by the Process Engineers (PE).

FIG. 1 is like an organizational chart. As is evident from FIG. 1, there are direct lines of two-way communication between IE and each of PE and RBT. It is the responsibility of the IE to dictate the process flow that the RBT will implement. In very rare cases, no new processes need to be created to build the desired route, in other words, a new sequence of existing process steps can be used. In such cases, the IE does need to initiate contact with any PE personnel when they give the process flow definition to the RBT. The much more common case is that the IE will require new processes, and it is the responsibility of the IE to work with each PE entity to setup these processes before the RBT executes the route build process. There is no line of communication between IE and Manufacturing, since by having discussions with the PE community, the IE is assured that Manufacturing will not have any issues moving the product on the final route. There is a "soft" line of communication between RBT and PE, which means that a PE may give the RBT small amounts of input to better control the tools in the fab that the IE does not need to be aware of. There are soft lines of communication between Manufacturing and each of RBT and PE, which means that if anything goes wrong at the time of manufacture, Manufacturing will contact either the RBT or the appropriate PE to resolve the problem, not the IE.

Figure 2:
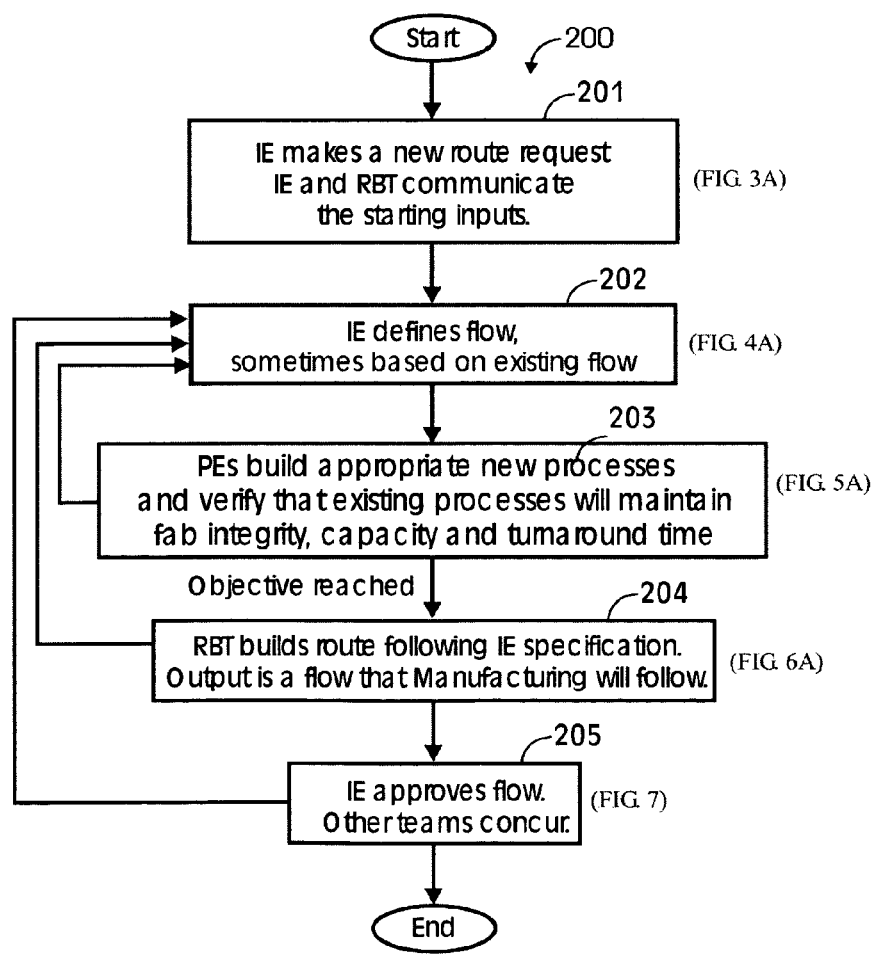
FIG. 2 is a flowchart showing the route build process according to a preferred embodiment of the present invention.

FIG. 2 is a flowchart showing the route build process 200, from start to end, from a broad perspective. FIGS. 3A, 3B, 4A, 4B, 4C, 4D, 4E, 5A, 5B, 5C, 6A, 6B, 6C, 6D, 6E and 7 illustrate the route build process from a more detailed perspective. FIG. 8 shows a system for running the process.

New Route Request: Access Limited to RBT

In a first step 201, the Integration Engineer (IE) makes a new route request. The IE and the Route Builders (RBT) communicate, and identify starting inputs. Together they decide if the new route has any overlap with existing routes, in other words, whether or not existing routes can be used as a starting point for the new route.

FIG. 3A is a flowchart that expands on the process given in step 201 of FIG. 2. Only the route build team (RBT) is permitted access to the system during this process. The RBT establishes identifying information for the route. The system creates a new route input system (RIS) template file. It should be noted that "disposition" operations are automatically included by the system at the end of the route and are not alterable by IE during the route input phase. The IE is forced by the system to add all operations before these mandatory final operations (see step 202 below). These steps are used by manufacturing to disposition the product after it is created, e.g. to send the product to a customer or to send the product to another location for further processing. FIG. 3B is an example of a screen (quasi "screen shot") on which the RBT enters the identifying data for a new route.

More specifically, with respect to FIG. 3A, in a first step (SECURITY), the RIS program limits access to the RBT entity. In a subsequent step, an RBT user identifies information for the route, entering information such as route name, part number, or family code. (The identifying data such as route name, route part number, route family code, route owner name, and route owner email are shown in FIG. 3B.) In a next step, the RBT user creates a new RIS template file containing identifying information and required disposition operations. In a final step, the RBT user creates an entry point for access by the IE, and the IE is alerted.

Defining the Flow: Access Limited to IE

In a next step 202, the IE defines the flow. This is sometimes based on one or more existing flows.

Figure 4A:
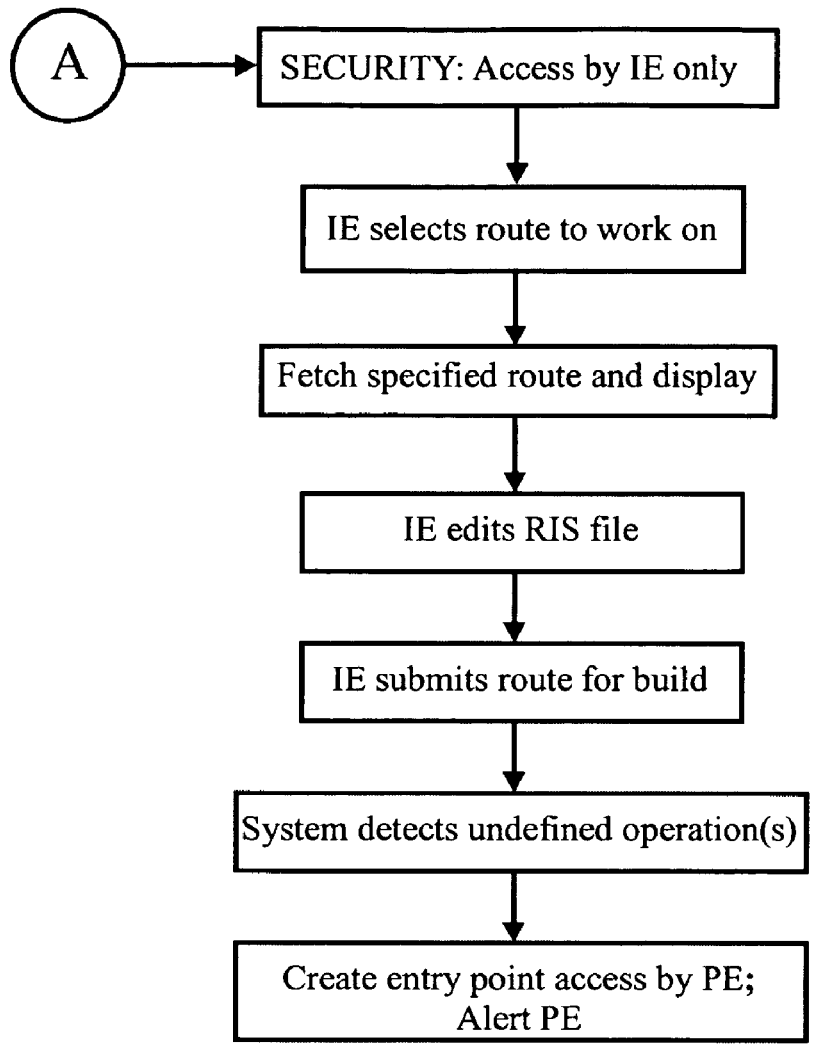
Figure 4B:
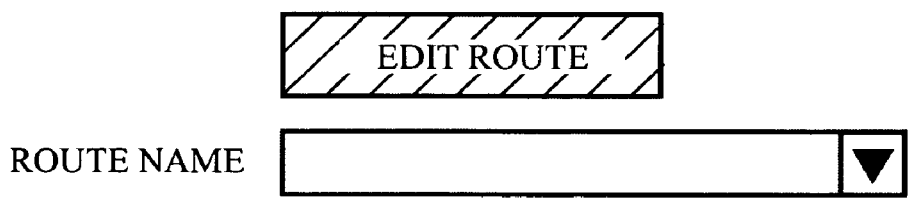

FIG. 4A is a flowchart that expands on the process given in step 202 of FIG. 2. Only an integration engineer (IE) (one at a time) is allowed access to the system during this process. The IE selects the route he wishes to work on, by making a selection from a drop-down menu of route names on a screen such as in FIG. 4B. The IE adds, edits, moves or deletes operations in the route, by making entries on a screen such as in FIG. 4C. A typical operation may be identified by its general type or "work area", e.g. CMP (chemical-mechanical polishing), followed by letters and/or numbers specifying a particular type of process in that workarea (hence 'CMPabc' in step 49). At each step the IE may click on an ADD, EDIT, MOVE or DELETE button. (Note, however, that the nth step (that is, the last step) is always the disposition step (DISP_EOL)). At each step the IE is allowed to provide freeform comments (Remarks/Notes) if they believe that such comments would aid the PE or RBT in approving or executing the route build. Such comments are especially encouraged if they are related to tooling issues in manufacturing, e.g. "process CMPabc is only ready for manufacturing on tool XYZ." When the IE is done editing the route, they can select the DONE EDITING option so that another authorized IE can edit the route. Any authorized IE can grant edit access to the route to another IE by selecting the UPDATE SECURITY option.

As shown in FIG. 4D (screen shot), the IE may add a new step by (1) entering an operation identifier (ID) manually; (2) choosing an operation ID from a menu of available operations (the menu being obtained from a database of operations); or (3) adding an operation already built into another route. Note that if an operation is added from a menu or from an existing route, the details of that operation are already defined. On the other hand, an operation entered manually has only a new name, with no process details; the operation is named but not yet defined.

As shown in FIG. 4A, in a first step (SECURITY), the RIS program limits access to the IE entity. In a next step, the IE selects a route to work on. The selected route is fetched and displayed. The IE may then edit the RIS file. When he is done editing, he can submit the route for build. The system then detects any undefined operation(s). Finally, the system creates an entry access point for the PE, and alerts the PE to join in the route build process.

FIG. 4E illustrates an example of a screen that IE would see when he wants to submit the route for build. At that time the IE has the opportunity to request that the RBT build the entire route or just a portion of it. The IE thus has the ability to work on later portions of the route while the RBT builds earlier portions of the route, so that product flow on earlier portions can occur at the same time the route is being extended (this is called building the route "ahead of the hardware").

The RIS allows the route requestor (IE) to build the complete route in one pass or submit the route for build piece-by-piece in multiple sequential passes. In the latter case, partial routes will be built. These partial routes may have WIP (wafers in process, i.e. product running on the partial route) after they receive normal approval.

Creating the Processes: Access Limited to PE

In a next step 203, the Process Engineer (PE) creates the new processes requested by the IE, or else rejects the request to create those processes. In addition, the PE entities validate that the requested process flow will not damage any fab tools or result in poor-quality manufacturing. If necessary, a PE can force the IE to re-define the flow, as indicated by the arrow looping back to step 202. When it has been determined by the IE and the PE that the flow is feasible and efficient, the objective has been reached; that is, the IE is satisfied that a route leading to high quality product has been reached and the PE is satisfied that the route will not damage tools or cause inefficiencies in manufacturing. The route is then ready for build by the RBT.

Figure 5A:
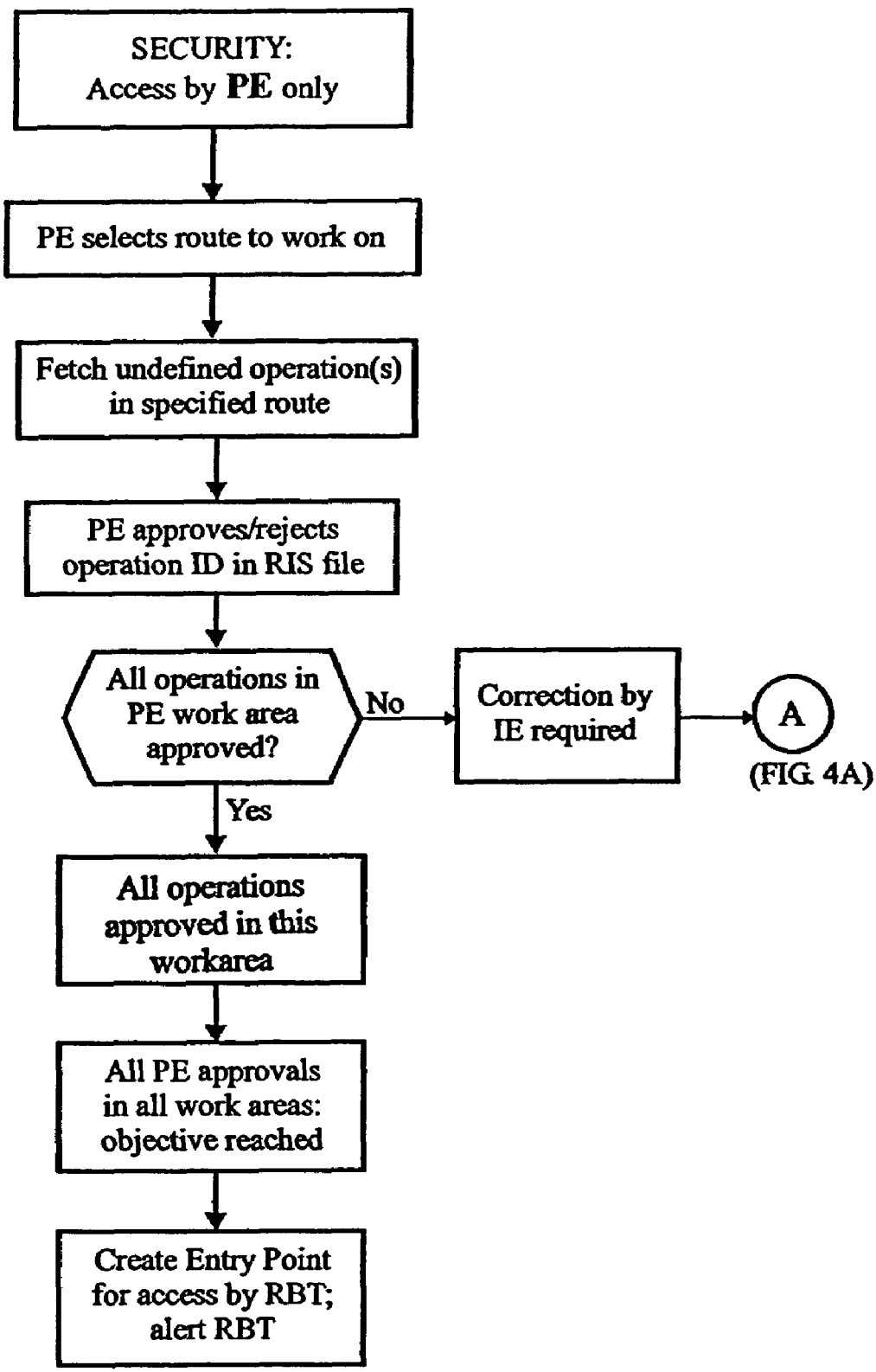

FIG. 5A is a flowchart that expands on the process given in step 203 of FIG. 2. Only the process engineer (PE) is allowed access to the system during this process. (Process Engineers (PEs) are also called Manufacturing Engineers (MEs) and are also called Sector Engineers (SEs).) The PE is authorized to approve or reject only certain steps in the route. Specifically, the PE may approve or reject only those steps corresponding to the PE's own "community" or "work area," and only those steps not already defined. The PE selects the route he wishes to examine, for example by making a selection from a drop-down menu of route names on a screen as shown in FIG. 5B.

The system then fetches and displays the as-yet-undefined steps in the route which are in the PE's work area, as shown in FIG. 5C. The PE and IE presumably have had discussions between them regarding the process details of these new steps; on the basis of those discussions, the PE accepts (APPROVE) or rejects (REJECT) each of these steps. (It is evident from the nonconsecutive numbering of steps in FIG. 5C that only certain (a truncated set of) steps are displayed for the PE.) Rejection of any new operations by any PE requires intervention by the IE to resolve the situation, as indicated by the feedback arrow from step 203 to step 202 in FIG. 2. The PE may also examine the full route by selecting the VIEW FULL ROUTE option to be sure that the new processes are located before or after other appropriate processes in order to reduce risk to tools in the fab. The route view that the PE will see is similar to FIG. 4C except that the PE will not have edit authority for any of the steps. After all PEs in all work areas have approved the steps they are authorized to approve, the system alerts the RBT that the route is now ready for build.

Building the Route: Access Limited to RBT

In a next step 204, the RBT builds the route following the IE's specification. The RBT creates (outputs) a flow that Manufacturing will follow. The RBT has the option to "unsubmit" the route back to the IE in a controlled manner if further examination reveals errors, as indicated by the arrow looping back to step 202.

Figure 6A:
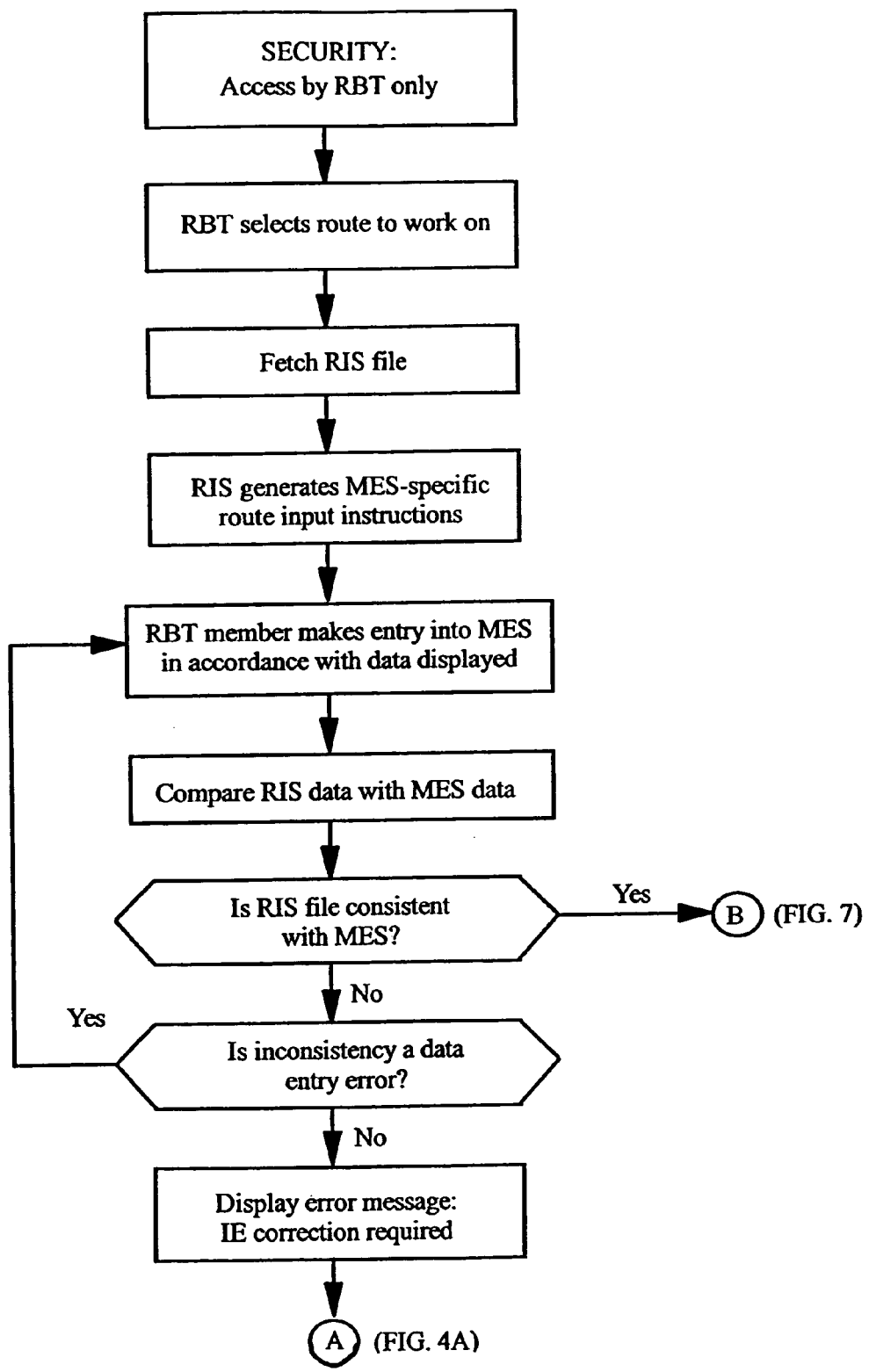

FIG. 6A is a flowchart that expands on the process given in step 204 of FIG. 2. After the IE has specified the route, and after the PE has given his approval (that is, "objective reached"), the RBT again is granted access to the system, in order to build the new route in the MES (Manufacturing Execution System). The RBT selects the RIS file to work on, for example by choosing the route name from a drop-down menu as shown in FIG. 6B. The RIS file is fetched and displayed. Each step will likely have additional information so that the operation data can be input into the MES in the appropriate manner (see FIG. 6C). This additional MES-specific information is generated by the RIS using defined business rules. If the IE entered any remarks about a given step, these will be displayed in the 'Remarks/Notes' column. The RBT member makes entries into the MES. If the RIS file is not consistent with the MES after the RBT inputs all data into the MES, an additional screen displays those steps for which the RIS data and MES data are inconsistent (see FIG. 6D). If the RBT member determines that the inconsistencies are due to data entry errors, they reenter the data in the MES and perform the RIS to MES compare again. If any inconsistencies remain that are not due to data entry errors, intervention by the IE is required. Such inconsistencies can occur even without data entry error by the RBT, because many routes in parallel are being worked on at any given time by all of the teams involved. This environment of constant change in the MES presents a challenge to the route creation process since it is desirable that this process occurs in the shortest possible period of time. One of the advantages of the present invention is that it provides a layer of control and consistency in the route creation process even though the MES is in a state of constant change.

The RIS keeps track of how integration (IE) assembled the operations in the route, e.g. whether the operations were manually added or pulled from an existing route. This information is available to the RBT in order to assist them in building the route. Since the MES may often require additional information besides the operation ID in order to completely specify the manufacturing instructions, this RIS tracking information can be very useful to assist the RBT in building the route in an efficient manner.

FIG. 6E illustrates the screen that a Route Build Team member (user) would see in the case that he wants to "unsubmit" the route back to the IE (thus following feedback loop from 204 to 202 in FIG. 2). The RBT person has the option to unsubmit the whole route back to IE to have them modify it, or the RBT person can submit only a portion of the route back to IE. The advantage of unsubmitting only a portion of the route is to keep some part of the route submitted so that the RBT can continue to enter data into the MES while the IE works on the problem portion of the route.

Approving the Flow

In a next step 205, the IE approves the flow. The other entities (RBT, PE) must then concur. It is assumed that the IE will not change the flow, but new data, or new business procedures, or other factors can lead the IE to a decision to make changes, as indicated by the arrow looping back to the step 202; this represents essentially a restart of the process. Once the route build is approved, the route is handed off to the manufacturing entity to implement the process and make product, such as a semiconductor fabrication process for manufacturing integrated circuits (ICs).

Figure 7:
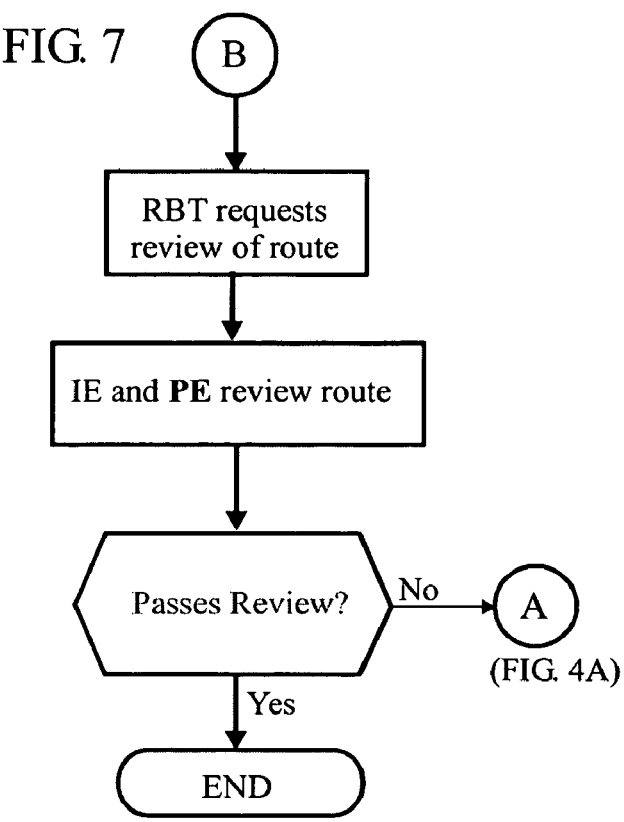
Figure 8:
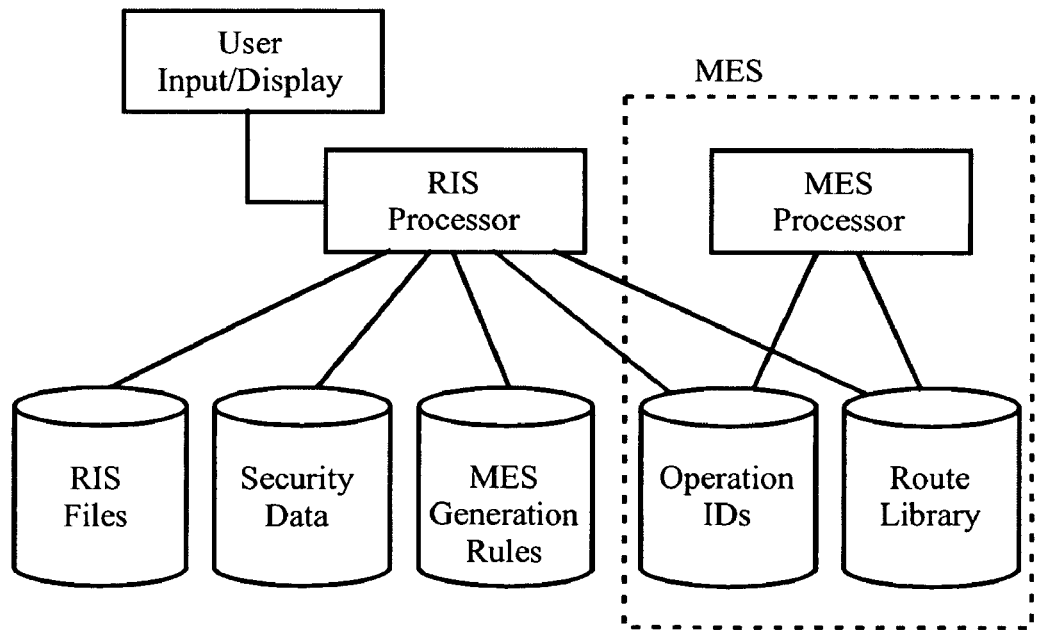
FIG. 8 is a schematic diagram of a system on which a route input system (RIS) according to the invention may be implemented.

FIG. 7 is a flowchart that expands on the process given in step 205 of FIG. 2. If the RIS file is consistent with the MES (that is, the RBT judges that no data entry errors exist and no further corrections by the IE are required), the RBT requests a review of the route. The IE and PE then have an opportunity to review the route. The IE makes further necessary corrections on the basis of this review.

The route build process described herein delivers a high level of control and consistency for the flow and, based on the descriptions set forth above, is readily implemented in a computerized system.

The end product of the RIS design process in this embodiment is data representative of a route (complete set of process steps) for entry into an MES, specifically an MES for operating a high-cost, complicated, automated manufacturing facility for a product, such as a modem, automated semiconductor fab running the SiView MES (by iiSC, Japan) software for manufacturing semiconductor devices such as integrated circuit (IC) chips.

Implementing the Invention

The Route Input System (RIS) of the present invention is suitably implemented as software running on a computerized system, as shown in a schematic and highly simplified form in FIG. 8. For example, each entity (IE, RBT, PE) is provided with a computer networked with the computer of each of other entities, and the Route Input System (RIS) software embodying the present invention runs on a server. The user's computer has conventional input and display devices. The route input system (RIS) of the present invention can be implemented as software running on a computer in a system of networked computers. Such systems are well known in the art, and therefore will be described only generally.

Typically, the IE starts the process, and the RIS software running on the system prompts and allows the various entities (IE, RBT, PE) to make their respective inputs, as described above. The various users access and interact with the RIS program, as described hereinabove, to create the route. The route which is generated can then be accessed (for example in an MES such as SiView) by manufacturing.

It will be appreciated that two separate systems are shown in FIG. 8, namely the RIS and the MES (the latter being well known in the art). The RIS of the present invention may be used with any MES, even a completely manual one. When implemented on a computer system, the advantage of the RIS is enhanced by having access to two of the MES databases: one containing the existing operations and one containing the existing routes.

Five databases are depicted in FIG. 8, as follows:

(1) RIS files, which are the files that contain the list of operations in the route and all associated parameters. They are created by the RBT, filled in by the IE team and the contained new operations are approved by the PE team.

(2) Security Data, which is a list of all users authorized to access the RIS, together with an identification of the team membership for each user ID (i.e. IE, PE, RBT)

(3) MES Generation Rules, which are a set of inputs that can control the behavior of the RIS in predefined ways. These rules are typically used to supplement the information provided by the IE so that a complete set of specifications appropriate for the MES can be provided to the RBT.

(4) Operation IDs, which is a list of the currently defined operations in the manufacturing line.

(5) Route Library, which is a list of the currently defined routes in the manufacturing line.

The RIS can query the MES databases, to accomplish the following (for example):

(1) Identifying process operations which are new and need Process Engineer (PE) involvement (2) Obtaining real-time information on which process operations remain to be built (3) Comparing of the MES version of the route to the RIS input, in order to find route build errors (4) Checking the MES route details against the latest business rules for naming conventions, required sub-parameters, operation relationships, etc.

The RIS code is updated when business rules are added or changed. The business rules dictate the details of the format that the data must take before it is entered into the manufacturing execution system software. The Business rules also control the quantity of information that must be entered by the IE in order to minimally specify the content of the route. By having a set of business rules that can be automatically applied to a minimal set of IE input, the route build process is made much more efficient. The IE can then concentrate their effort on generating product flows instead of knowing and specifying all details related to the MES.

The present invention may be realized in a centralized fashion in one computer system, or in a distributed fashion where different elements are spread across several interconnected computer systems. Any kind of computer system (or other apparatus adapted for carrying out the methods described herein) is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system, is able to carry out these methods.

Computer program in the present context means any expression, in any language, code or notation, of a set of instructions intended to cause a system having an information processing capability to perform a particular function either directly or after conversion to another language, code or notation and/or reproduction in a different material form.

Although the invention has been shown and described with respect to a certain preferred embodiment or embodiments, equivalent alterations and modifications will occur to others skilled in the art upon the reading and understanding of this specification and the annexed drawings. In particular regard to the various functions performed by the above described components (assemblies, devices, circuits, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

It is noted that the foregoing has outlined some of the more pertinent objects and embodiments of the present invention. This invention may be used for many applications. It will be clear to those skilled in the art that other modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art. Thus, although the description is made for particular arrangements and methods, the intent and concept of the invention is suitable and applicable to other arrangements and applications. Accordingly, the invention is intended to encompass all such alternatives, modifications and variations which fall within the scope and spirit of the invention and the following claims.

I claim:

1. A method of building a route characterized as a sequential series of manufacturing process steps for manufacturing a product, said building being performed using a route build system, the method comprising the steps of:
   defining an Integration Engineer (IE) entity for making input to a route build process to obtain a final product configuration;
   defining a Route Builder (RBT) entity for executing building of the route that generates the product;
   defining a Process Engineer (PE) entity responsible for the processes and the tools for generating the product;
   defining a manufacturing entity responsible for implementing the manufacturing process to generate the product;
   first allowing access to the route build system only by the RBT entity for the RBT to enter identifying information for the route;
   then allowing access to the route build system only by the IE entity for the IE to perform at least one of adding, editing, moving and deleting operations in the route;
   then allowing access to the route build system only by the PE entity for the PE to examine steps in the route; and
   then allowing access to the route build system again only by the RBT entity for the RBT to build the route.

2. The method of claim 1, further comprising the step of creating a new route input system (RIS) template file, in response to the RBT entity entering identifying information for the route.

3. The method of claim 1, wherein the IE adds an operation by one of (1) entering an operation identifier (ID) manually, (2) choosing an operation ID from a menu of available operations which are already defined, the menu being obtained from a database of operations; or (3) adding an operation built into another route, said operation thereby being already defined.

4. The method of claim 3, wherein the steps examined by the PE consist of steps which correspond to a work area of the PE and which are not already defined.

5. The method of claim 4, wherein:
after all PEs in all work areas have approved the steps they have examined, the RBT is authorized to examine the route.

6. The method of claim 1, wherein:
the manufacturing process is a process for semiconductor device fabrication; and
the product is an integrated circuit (IC) chip.

7. The method of claim 1, wherein:
the route comprises a new sequence of existing process steps; and
the PE entity provides process flow definition to the RBT.

8. The method of claim 1, wherein:
the route comprises a new process step; and
the IE entity defines said new process step in accordance with communication with the PE entity, before the RBT builds the route.

9. The method of claim 1, wherein:
the PE entity provides tool control information to the RBT.

10. The method of claim 1, further comprising the step of:
establishing communication between the Manufacturing entity and each of the RBT and the PE entities, wherein the Manufacturing entity communicates with one of the RBT and the PE entity to resolve a manufacturing problem.

11. The method of claim 1, wherein:
the process is implemented as software running on a computerized electronic system.

12. A computerized method of building a route characterized as a sequential series of manufacturing process steps for manufacturing a product, said building being performed using a route build system, the method comprising the steps of:
defining an Integration Engineer (IE) entity for making input to a route build process to obtain a final product configuration;
defining a Route Builder (RBT) entity for executing building of the route that generates the product;
defining a Process Engineer (PE) entity responsible for the processes and the tools for generating the product;
defining a manufacturing entity responsible for implementing the manufacturing process to generate the product;
allowing the IE entity to make a new route request by identifying starting inputs in accordance with communication with the RBT entity,
allowing the IE entity to define a sequence of processes characterized as a flow;
allowing the PE entity to perform one of (1) creating a new process in accordance with a request by the IE entity and (2) rejecting said request;
allowing the RBT entity to build the route as specified by the IE entity, and
allowing the IE entity to approve the flow.

13. The method of claim 12, further comprising the steps of:
allowing the PE entity to validate said flow.

14. The method of claim 13, further comprising the step of:
causing the IE entity to re-define the flow in response to a determination by the PE entity that the flow is invalid.

15. The method of claim 14, wherein said causing step further comprises causing the IE entity to re-define the flow so that the IE entity determines that the flow is acceptable in accordance with a first criterion and the PE entity determines that the flow is acceptable in accordance with a second criterion, and further comprising the step of
subsequently allowing the IE entity to submit the route to the RBT entity.

16. The method of claim 12, further comprising the steps of:
allowing the RBT to create a flow for execution by the manufacturing entity.

17. The method of claim 16, wherein:
the RBT entity is authorized to cause the IE entity to re-define the flow in accordance with an examination thereof by the RBT entity.

18. The method of claim 12, wherein the RBT and PE entities concur with the IE entity approval of the flow.

19. The method of claim 12, wherein a previously existing route is used as a starting point for the new route.

20. A computer-readable storage medium having stored therein instructions for causing a computer to effect the method of claim 12.

* * * * *